Aug. 13, 1940.  W. F. DEHUFF  2,211,103
AIR VENT FOR FLOUR HOPPERS
Filed Feb. 1, 1939

INVENTOR
Walter F. Dehuff
BY George S. Hastings
ATTORNEY

Patented Aug. 13, 1940

2,211,103

UNITED STATES PATENT OFFICE 2,211,103

AIR VENT FOR FLOUR HOPPERS

Walter F. Dehuff, Glen Rock, Pa., assignor to American Machine & Foundry Company, a corporation of New Jersey Application February 1, 1939, Serial No. 254,050

4 Claims. (Cl. 226—122)

This invention relates to air vents for flour hoppers and the like, its main object being to prevent dust from blowing out of the top of the hopper when discharging the same into a mixing machine.

This object is achieved by providing the hopper with a central Venturi tube which causes the air displaced by the flour to be vented gradually, dissipating its high initial velocity as it rises, so that not enough force is left to blow it out of the top of the hopper, which may then be left open during its operation.

Figure 1:
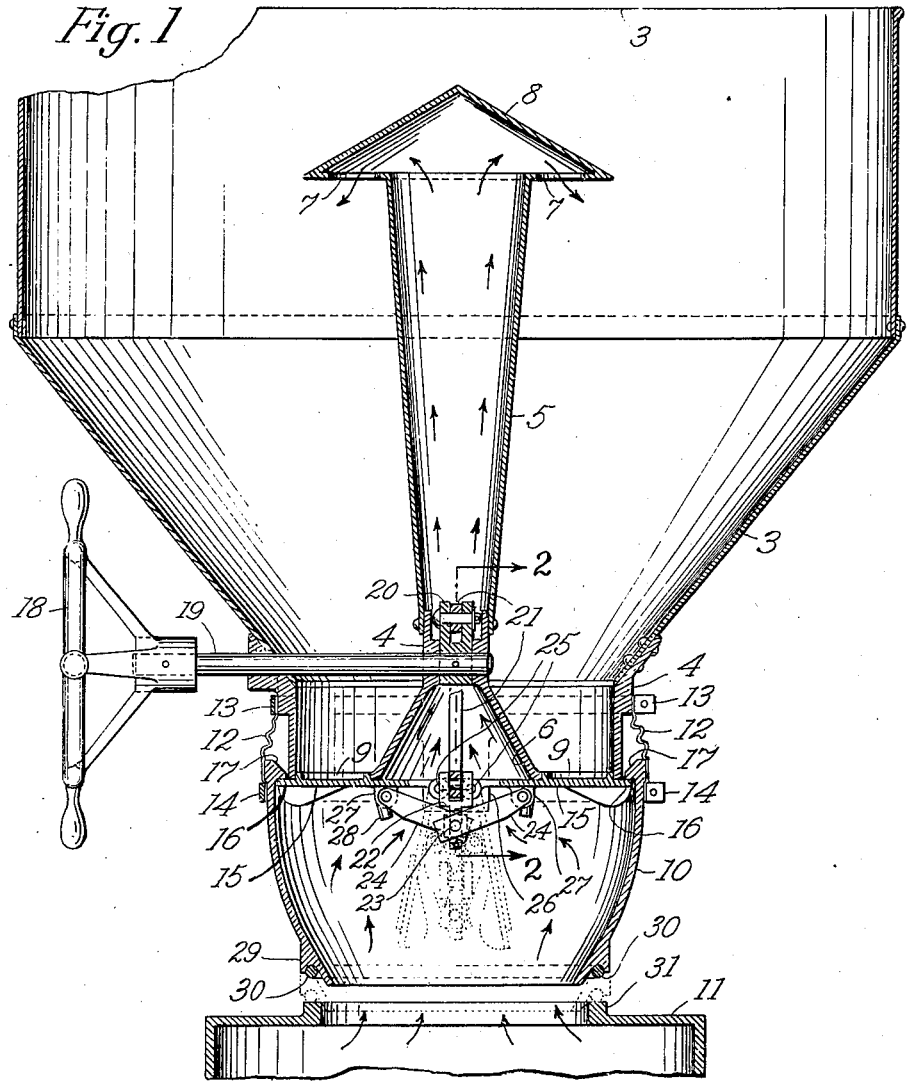
Figure 2:
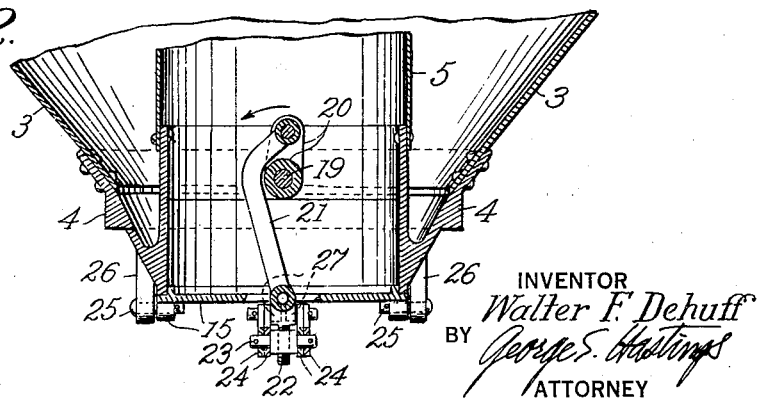

In the accompanying drawing which forms a part of this specification and in which like characters of reference indicate the same or like parts:

Fig. 1 is a sectional side elevation of a flour hopper equipped with a Venturi tube, according to my invention; and Fig. 2 is a sectional side elevation on line 2—2 of Fig. 1.

Referring to the drawing, the hopper 3, which is mounted on a gate housing 4, carries a centrally disposed Venturi tube 5 having a flaring inlet 6 in housing 4 and outlets 7 on the under side of its cover 8 near the top of the hopper 3.

The housing 4, around the Venturi inlet 6, has openings 9 for the discharge of the flour through the spout 10 into the mixer 11. The spout 10 is attached to housing 4 by a canvas connector 12 fastened at its margins to the housing and chute by metal straps 13 and 14, respectively. This flexible connection provides ready adjustability for different heights of mixers and at the same time gives a perfect seal between the spout and hopper, avoiding blowing of flour dust at that point. The discharge openings 9 in housing 4 are closed by gates 15, whose flanges 16 support lugs 17 on spout 10, thereby holding the latter in its up-position when the gates are closed.

The gates are opened by a hand-wheel 18 on a shaft 19 supported in bearings of housing 4. This hand-wheel imparts motion to a crank 20 which, in turn, through a link 21 attached to a clevis 22 carrying an adjustable pivot shaft 23 actuates two pairs of toggles 24 which swing the gates 15 on pivots 25 supported in lugs 26 depending from housing 4. The toggles 24 are pivoted in lugs 27 on the gates 15, bosses 28 extending from these lugs at such an angle as to engage with one another in the open position of the gates.

When the hopper has been filled with a weighed quantity of flour, the hand-wheel 18 is turned in the counter-clockwise direction, thereby opening the gates 15 and lowering the spout 10 onto the mixer 11, as shown in dotted lines in Fig. 1, thus discharging the contents of the hopper into the latter. Into a groove 29 at the bottom of chute 10 is cemented a sponge-rubber gasket 30 which comes to rest on the receiving lip 31 of the mixing bowl 11, thereby making an air-tight joint at this point when the spout is lowered.

The material entering the mixer displaces air at a rapid rate, resulting in an upward stream of air at high velocity. By entering the Venturi tube 5, as shown by the arrows in Fig. 1, this air stream is gradually dampened so that, when reaching the top of the hopper, it lacks the force to create a puff of flour dust.

What is claimed is:

1. The combination with an elevated hopper to charge a receptacle with finely divided material, of a Venturi tube within said hopper and spaced from its walls and adapted to vent upwardly into the hopper the air displaced during the charging of the receptacle, the lower end of said tube terminating above said receptacle.

2. The combination with an elevated hopper to charge a receptacle with finely divided material, of a Venturi tube within said hopper and spaced from its walls and adapted to vent upwardly into the hopper the air displaced during the charging of the receptacle, said hopper having an open top and a spout on its lower end adapted to closely fit the inlet of a receptacle, the lower end of said tube terminating within said spout.

3. The combination with an elevated hopper to charge a receptacle with finely divided material, of a Venturi tube within said hopper and spaced from its walls and adapted to vent upwardly into the hopper the air displaced during the charging of the receptacle, and gates adjacent the lower end of said Venturi tube which are adapted to be opened to deliver the material to the receptacle.

4. The combination with an elevated hopper to charge a receptacle with finely divided material, of a central Venturi tube within said hopper adapted to vent upwardly into the hopper the air displaced during the charging of the receptacle, and gates adjacent the lower end of said Venturi tube which are adapted to be opened to deliver the material to the receptacle, a spout adapted to closely fit the inlet of the receptacle and supported by said gates in an elevated position when they are closed, and a flexible connector between said spout and said hopper.

WALTER F. DEHUFF.